(12) United States Patent
Arana Hidalgo et al.

(10) Patent No.: US 9,919,785 B2
(45) Date of Patent: Mar. 20, 2018

(54) STRINGER MADE OF COMPOSITE MATERIAL WITH AN ELASTIC RUN-OUT AND METHOD OF MANUFACTURING SAME

(71) Applicant: Airbus Operations, S.L., Getafe (Madrid) (ES)

(72) Inventors: Alberto Arana Hidalgo, Getafe (ES); Tomas Rodriguez Hernandez, Getafe (ES)

(73) Assignee: Airbus Operations, S.L., Getafe (ES)

( * ) Notice: Subject to any disclaimer, the term of this patent is extended or adjusted under 35 U.S.C. 154(b) by 855 days.

(21) Appl. No.: 14/067,655

(22) Filed: Oct. 30, 2013

(65) Prior Publication Data
US 2014/0120302 A1   May 1, 2014

(30) Foreign Application Priority Data
Oct. 31, 2012  (EP) .................................. 12382419

(51) Int. Cl.
*B64C 1/06*     (2006.01)
*B64C 3/18*     (2006.01)

(52) U.S. Cl.
CPC .............. *B64C 1/064* (2013.01); *B64C 3/182* (2013.01); *Y10T 156/10* (2015.01); *Y10T 428/24124* (2015.01)

(58) Field of Classification Search
CPC . B64C 1/064; B64C 3/182; Y10T 428/24124; Y10T 156/10

USPC ............................................. 428/113; 156/60
See application file for complete search history.

(56) References Cited

U.S. PATENT DOCUMENTS

| | | |
|---|---|---|
| 4,606,961 A | 8/1986 | Munsen et al. |
| 2010/0272954 A1 | 10/2010 | Roming et al. |
| 2010/0304094 A1 | 12/2010 | Brook et al. |
| 2012/0045609 A1 | 2/2012 | Brook et al. |
| 2012/0052247 A1 | 3/2012 | Pook et al. |
| 2012/0308770 A1 | 12/2012 | Eli-Eli et al. |

FOREIGN PATENT DOCUMENTS

| | | |
|---|---|---|
| EP | 2256031 | 12/2010 |
| WO | 2011121340 | 10/2011 |

OTHER PUBLICATIONS

European Search Report, dated Apr. 22, 2013.

*Primary Examiner* — Brian Handville
(74) *Attorney, Agent, or Firm* — Greer, Burns & Crain, Ltd.

(57) ABSTRACT

A stringer made of composite material for reinforcing aircraft skin panels. Plies are introduced at 90° in a segment close to the stringer run-out, and progressively reducing the number of plies at 0°, such that the majority of the number of plies is at 90° in an segment adjacent to the run-out, so the stiffness of the run-out is reduced, and the load it supports is also therefore reduced. This is an alternative solution to the solutions already existing for getting the stringer run-outs to support a smaller load, thereby reducing both the risk of the plies of the stringer peeling off and the risk of separation between stringer and skin panel. A method of manufacturing said stringer is also provided.

9 Claims, 3 Drawing Sheets

STRINGER MADE OF COMPOSITE MATERIAL WITH AN ELASTIC RUN-OUT AND METHOD OF MANUFACTURING SAME

CROSS-REFERENCES TO RELATED APPLICATIONS

This application claims the benefit of the European patent application No. 12382419.5 filed on Oct. 31, 2012, the entire disclosures of which are incorporated herein by way of reference.

BACKGROUND OF THE INVENTION

The present invention generally relates to manufacturing aircraft components, such as skin structures formed by a skin panel reinforced on its inner face by a plurality of stringers structurally bonded to the skin panel.

In manufacturing components for the aeronautical industry, especially for manufacturing structural elements of an aircraft, the use of composite materials formed by an organic matrix and continuous fibers, for example carbon fiber-reinforced plastic (CFRP), oriented in one direction in one and the same ply is well known. United States patent application US 2010/0233424 A1 is an example of these techniques.

An aircraft skin structure, for example part of the fuselage or part of a wing, is conventionally formed by a skin panel and by a series of stringers attached to one of the faces of the panel by means of co-bonding in order to reinforce it. The stringers are arranged in a longitudinal direction with respect to said panel, and a series of transversely arranged ribs collaborating with the stringers to provide strength to the panels and to improve the stability under compression or shearing thereof are further incorporated.

These composite materials are used both for manufacturing skin panels and for manufacturing the stringers, which can be manufactured with different sections, for example with a T-shaped section, I-shaped section, L-shaped section, trapezoidal-shaped section, etc.

The drawbacks existing with stringer run-outs is well known in the aeronautical industry because a redistribution in the load transfer between the stringer and the panel to which it is attached occurs at those run-outs, bringing about a concentration of stresses (tangential in the plane of the attachment and of peeling outside the plane) in the bonded attachment in that zone, which can cause the stringer and panel to become detached.

Stringer stiffness in skins is obtained mainly as a result of the plies with a fiber orientation at 0°, i.e., with the fibers oriented in the same longitudinal direction of the stringer. However, this conventional arrangement with most plies at 0°, extending along the length of the stringer, entails a limitation when reducing the load supported by the run-outs, because its stiffness must be reduced at the run-outs precisely to reduce the load which they support and must transfer to the skin through the bonded attachment.

The solutions known in the state of the art for overcoming the problems associated with the load transfer at stringer run-outs are generally based on reducing the stringer cross-sectional area, usually by means of reducing the stringer height or, additionally, by means of progressively reducing the number of plies towards the run-out. With these techniques the thickness, and therefore the stiffness of the stringer run-out, is reduced (the elastic modulus is reduced), encouraging an early start of the progressive redistribution of loads between the stringer and the panel at the same time.

An example of these solutions is described in United States patent applications US 2005/0211846 A1 and US 2012/0100343 A1.

However, these conventional solutions have certain drawbacks because, for example, with the solution of reducing the stringer height, stringer efficiency is reduced at the same time to increase the stability of the panel preceding the stringer run-out.

In the case of the second solution referring to the reduction of plies, it has limitations concerning the lowest possible number of fabrics at the stringer run-out below which manufacture and industrialization defects arise during compaction and cobonding of the stringer to the panel.

This second drawback limits the complete elimination of all the fabrics at 0° at the stringer run-out and therefore maintains a high elastic modulus therein with respect to a solution that would allow completely eliminating or having fewer fabrics at 0° at the run-out thereof.

Other known solutions are based on using several types of plies with a different elastic modulus at the run-out, i.e., with different properties, for example using fibers of different materials providing less stiffness. However, although the use of different types of plies or sheets is feasible, it is not contemplated by the methods in use for calculating structures such as those contemplated herein, in addition to excessively complicating the manufacturing process of these components, so it is not widely used today.

SUMMARY OF THE INVENTION

One of the objects of the invention is to obtain in a simple manner reinforcing stringers the run-outs of which support a smaller load, as well as to reduce the stress which the attachment between stringer and panel supports in order to reduce the risk of peeling between the stringer and the skin panel, reducing the risk of separation between elements, all of which furthermore does not affect the capacity of the stringer to prevent buckling, efficiently reducing the elastic modulus only at the run-out, and without needing to modify the currently existing design or manufacturing standards for the constituting sheets or plies.

The present invention solves in a fully satisfactory manner the drawbacks explained above by means of the subject matter defined in the attached independent claims.

The present invention comprises introducing plies at 90° in a segment close to the stringer run-out, overlapping pre-existing plies at 0°, and after an overlap distance between both, the progressive elimination of the number of plies at 0°, so that the plies at 0° have been completely or for the most part replaced with plies at 90° in a stringer segment adjacent to the run-out. The plies introduced are made of the same material and have the same characteristics as the plies that are already present, changing only their orientation with respect to a fixed reference. The invention is based on progressively substituting or replacing plies at 0° (which are effective for the stringer overall but detrimental to its run-out for a smooth transition of the load to the skin) with plies at 90° at said run-out by means of an overlap between the added fabrics at 90° and those at 0° which are eliminated, assuring structural continuity of the element.

By interrupting the plies at 0° and replacing them with plies at 90° at the run-out, the axial stiffness or elastic modulus at the stringer run-out is less than in the rest of the stringer because the stiffness of the plies with their fibers at 90° with respect to the axial bending of the stringer longitudinal axis is less than that of the plies at 0° due, precisely, to the orientation of the fibers at 90° which provide less axial bending strength since they are placed transverse to the longitudinal axis of the stringer.

The present invention allows having a lower number of plies oriented at 0° while maintaining the same number of plies at the stringer run-out set by manufacturing requirements (a lower number causes porosities or peeling).

In the present invention, plies at 0° must be understood as plies that are or will be part of a stringer and the reinforcing fibers of which are or will be oriented in the same direction as the longitudinal axis "X" of the stringer. Similarly, plies at 90° must be understood as the plies that are or will be part of a stringer and the fibers of which are or will be oriented forming a 90° angle with respect to the longitudinal axis "X" of the stringer, i.e., the fibers of that ply are orthogonal with respect to the stringer.

A first aspect of the invention therefore relates to a stringer for reinforcing aircraft skin panels which is formed by a plurality of superimposed plies of composite material, where each ply includes reinforcing fibers oriented in one direction. The number of plies with a fiber orientation at 90° in a stringer segment adjacent or consecutive to a run-out is greater than the number of plies with a fiber orientation at 0° in that same segment, such that the stiffness or the elastic modulus in that portion adjacent to the run-out is less than in the rest of the stringer, or in other words, the stringer is more flexible in that segment as a result of the majority presence of plies at 90° compared to the number of plies at 0°.

The number of plies at 90° in said adjacent stringer segment (AS) is also greater than the number of plies with a fiber orientation of 90° in a stringer inner segment (IS).

The invention also relates to a particular manner of obtaining that end segment with a majority of plies at 90°, which consists of forming an overlap segment extending between an inner segment and an adjacent segment (adjacent) to the run-out, in which at least one ply at 90° is added, being superimposed on a ply at 0° already existing in the inner segment, which is eliminated in the next segment. The formation of this overlap segment has the effect of providing a smooth and progressive load transfer between the inner segment and the stringer run-out, i.e., between zones of the stringer with different stiffness.

The invention also relates to an aircraft skin structure, comprising an aircraft airfoil skin panel and at least one stringer such as that described above attached to said panel.

Another aspect of the invention relates to a method of manufacturing stringers for reinforcing aircraft skin panels, which comprises stacking plies of composite material with reinforcing fibers oriented in one direction in each ply. The method comprises stacking a ply with fibers oriented at 0° with respect to the longitudinal axis of the stringer, and terminating (i.e., ending the ply by means of a termination edge, for example by cutting the ply) said ply at 0° at a termination edge which is located at a certain distance from the stringer run-out. Then a ply with fibers oriented at 90° with respect to the axis of the stringer is stacked, so that a segment of said ply at 90° overlaps an end segment of said ply at 0° (the previously defined overlap zone (OS) being generated), and so that said ply at 90° extends to the stringer run-out.

As can be seen, the described process comprises replacing or substituting plies at 0° used in the stringer inner portion with plies at 90°, and repeating the process for the number of plies at 0° that is considered necessary, until the number of plies with a fiber orientation at 90° in an adjacent stringer segment adjacent to the run-out thereof is greater than the number of plies with a fiber orientation at 0°.

As a result of eliminating plies at 0°, the number of plies with a fiber orientation of 0° in the adjacent stringer segment (AS) adjacent to the run-out (3) is less than the number of plies with a fiber orientation at 0° in the stringer inner segment (IS).

The invention successfully reduces the load supported by the stringer run-outs when the aircraft is in flight by means of changing the type of plies with regard to fiber orientation in an adjacent segment adjacent to a stringer run-out.

It is not necessary to modify the geometric shape of the run-out to implement the invention, so the manufacturing or tooling methods already in operation in a factory are not modified, although the tooling in the overlap segment of fabrics must be adapted to this local over-thickness as is done today to account for over-thicknesses of non-structural fabrics.

The invention does not require manufacturing different types of plies with different properties concerning their stiffness or the type of fibers they use, so the desired effect is obtained by using the same type of plies, simply modifying the orientation of the plies and applying a local over-thickness.

The invention is particularly applicable in manufacturing aircraft airfoils, such as wings and horizontal stabilizers.

Nevertheless, the person skilled in the art will understand that the invention can likewise be applied to other aircraft components suffering the same drawbacks.

BRIEF DESCRIPTION OF THE DRAWINGS

To complement the description that is being made and for the purpose of aiding to better understand the features of the invention, according to a preferred practical embodiment thereof, a set of drawings is attached as an integral part of this description in which the following has been depicted with an illustrative and non-limiting character.

Drawing B is a perspective schematic depiction of a section of a stringer, where the stack of plies is seen.

Drawings C and D are perspective schematic depictions of a stack of plies, where the different plies have been depicted in an exploded view.

Figure 2:
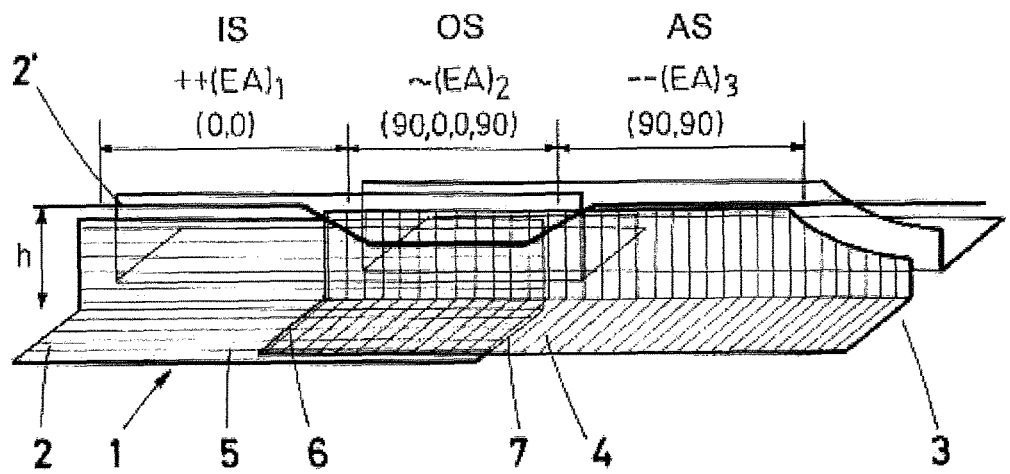

FIG. 2 shows a schematic depiction of the arrangement of plies in three consecutive segments of a stringer according to the invention, towards one of the run-outs thereof.

Figure 3:
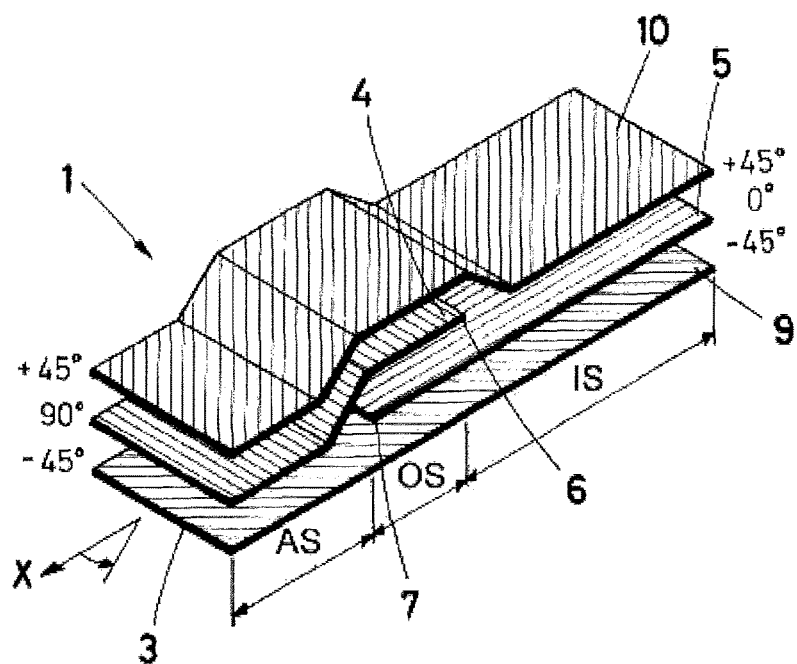

FIG. 3 is an exploded perspective schematic depiction of a stack of plies showing the process of replacing a ply at 0° with a ply at 90° by means of an overlap segment according to the invention.

Figure 4:
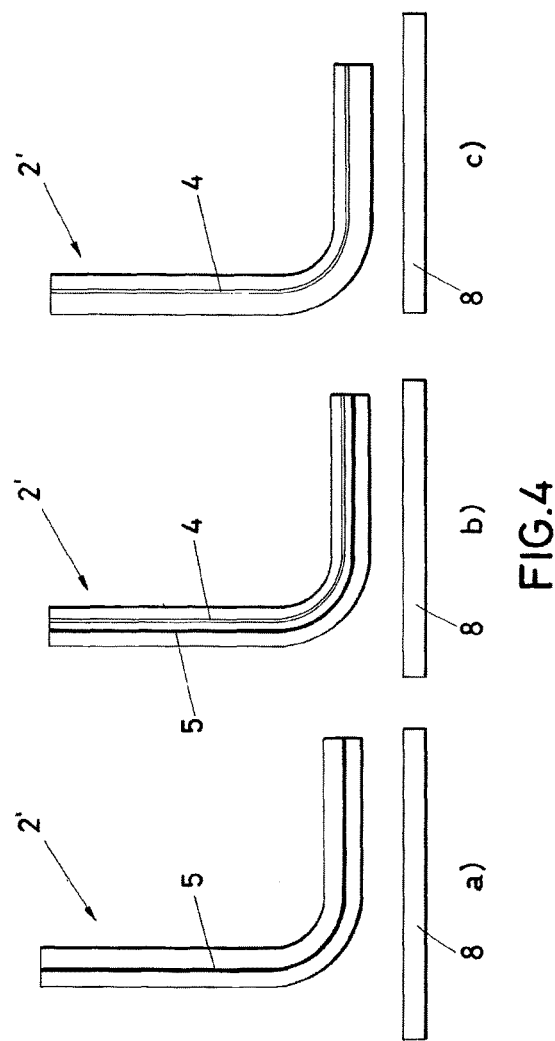

FIG. 4 shows schematic depictions of three cross-sections of an L-shaped stringer according to the invention; drawing (a) is a cross-section according to a transverse plane in a stringer inner segment (IS).

Drawing (b) is a cross-section similar to the preceding drawing but taken in the stringer overlap segment (OS);

Drawing (c) is a cross-section similar to the preceding drawings but taken in the segment (AS), adjacent to the stringer run-out.

DETAILED DESCRIPTION OF THE PREFERRED EMBODIMENTS

Figure 1:
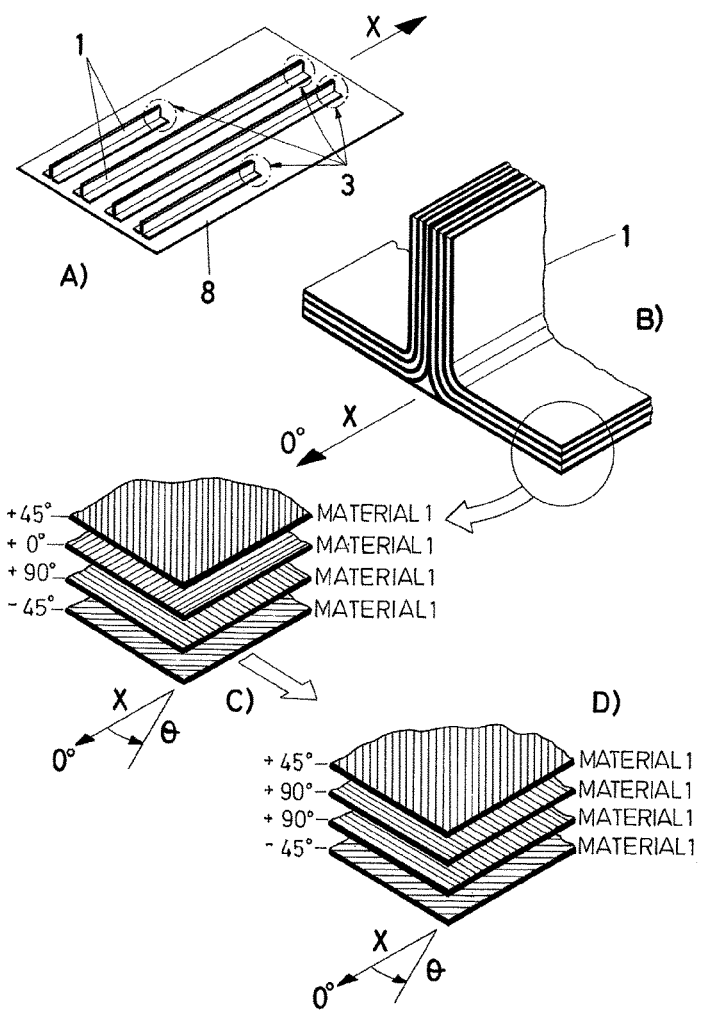
FIG. 1 shows a perspective view of a portion of an aircraft skin structure in drawing A.

FIG. 1 shows a perspective view of a portion of an aircraft skin structure in drawing A, comprising an aircraft skin panel and a series of stringers attached to said panel, where the "X" axis is the longitudinal axis of the stringer. Drawing B is a perspective schematic depiction of a section of a stringer, where the stack of plies is seen. Drawings C and D are perspective schematic depictions of a stack of plies, where the different plies have been depicted in an exploded view, and the hatch lines indicate the orientation "θ" of the fibers of each ply with respect to the "X" axis. Drawing C corresponds to a stack of plies in a stringer inner segment where a ply at 90° is superimposed on a ply at 0°, whereas drawing D is a distribution of plies in an outer segment, where the ply at 0° of drawing C is no longer present and is replaced with the aforementioned ply at 90°.

FIG. 2 shows a schematic depiction of the arrangement of plies in three consecutive segments of a stringer according to the invention, towards one of the run-outs thereof, showing from left to right an inner segment (IS), a ply overlap segment (OS), and finally an adjacent segment (AS) adjacent to the run-out. The solid line "h" relates to the stringer height and indicates the possibility of reducing the stringer height in the ply overlap zone.

FIG. 3 is an exploded perspective schematic depiction of a stack of plies showing the process of replacing a ply at 0° with a ply at 90° by means of an overlap segment according to the invention.

FIG. 4 shows schematic depictions of three cross-sections of an L-shaped stringer according to the invention. Drawing (a) is a cross-section according to a transverse plane in a stringer inner segment (IS); drawing (b) is a cross-section similar to the preceding drawing but taken in the stringer overlap segment (OS); and drawing (c) is a cross-section similar to the preceding drawings but taken in the segment (AS), adjacent to the stringer run-out. To aid in understanding these three drawings, only the plies involved in the invention have been depicted, although it must logically be understood that the stringer is formed by a plurality of stacked plies.

FIGS. 2 and 3 schematically show the process of introducing a ply at 90° in an overlap segment close to the stringer run-out (3), and progressively reducing the number of plies at 0°, so that there is a majority of plies at 90°, or at least there is a number of plies at 90° greater than the number of plies at 0°, in an adjacent segment (AS) adjacent to the run-out (3).

FIG. 2 shows in greater detail the distribution of plies in a portion of an inverted T-shaped stringer (1), formed by the attachment of two L-shaped profiles (2,2'), such as those shown in FIG. 4, arranged symmetrically and attached to one another. The stringer conventionally includes a web projecting from a foot which is attached to a skin panel (8) by means of a layer of adhesive (not depicted). The stringer includes a run-out (3) with a reduced height to decrease the stiffness of that run-out.

In an inner segment (IS) of the stringer (1) formed for the most part by plies at 0°, the load supported by the stringer in that segment is proportional to the product E·A, where E is the elastic modulus in the longitudinal direction of the stringer and A is the stringer cross-sectional area.

According to the invention, the stringer (1) comprises a ply at 90° (4) and a ply at 0° (5) superimposed on one another exclusively in an overlap segment (OS). As seen in FIGS. 2 and 3, said overlap segment (OS) is close to the run-out (3) of the stringer (1) and disappears, giving way to the segment adjacent to the run-out (3).

In said overlap segment (OS), the ply at 90° (4) is attached directly to said ply at 0° (5) and preferably arranged above the ply at 0°, i.e., at a higher level, as seen from a cross section of a skin panel (8) to which the stringer (1) will be attached to reinforce it and to keep maintaining the symmetry of the laminate in the stringer final segment once fabric at 0° has been eliminated, as is more clearly seen in the drawings of FIGS. 3 and 4.

The added ply at 90° (4) extends approximately from the stringer run-out (3) to the termination edge (6) located in a stringer inner segment, and such that an inner portion of said ply at 90° (4) is superimposed on a ply at 0° (5) already existing in a stringer inner portion. Said ply at 0° (5) is interrupted or ended at a termination edge (7) located at a point close to the run-out (3).

The overlap segment (OS) thus extends between a termination edge (6) of the added ply at 90° (4) and a termination edge (7) of the ply at 0° (5). Edge (7) is closer to said run-out (3) than edge (6). This overlap segment (OS) has the effect of producing a smooth and progressive load transfer from a stringer inner segment to the run-out (3).

FIGS. 2 and 3 show the process for substituting or replacing a fabric or ply at 0° with a ply at 90°, but it must be understood that the process is repeated in the same manner for several plies at 0° until reaching a majority number of plies at 90° that is considered necessary in an adjacent segment to the run-outs.

The figures show this technique applied to one of the stringer run-outs, but it can be applied to the two run-outs of a stringer in the applications in which it is considered necessary.

Three segments with a different elastic modulus which progressively decreases from the stringer inner segment towards the run-out (3) are distinguished in the stringer portion shown in FIGS. 2 and 3. The elastic modulus of the overlap zone (OS) is less than the elastic modulus of the stringer inner segment (IS), and the elastic modulus of the adjacent segment (AS) to the run-out (3) is less than the modulus of the overlap segment.

As seen in FIGS. 2 and 3, one of the advantages of the invention is that the stringer height (h) can be reduced in the overlap segment (OS) with respect to the stringer height in the inner segment (IS). Since the thickness of the stringer is slightly increased when adding the ply at 90° in the overlap segment on an already existing ply at 0°, the height thereof in that segment can be reduced so that the cross-sectional area remains the same, which has the effect of maintaining a smooth load transfer between segments with a different elastic modulus. Therefore, by maintaining the stringer cross-sectional area, i.e., not modifying the area, the load supported by the stringer run-out is smaller.

The method for manufacturing stringers is also seen in FIGS. 2 and 3 and it comprises stacking a ply with fibers oriented at 0° (5) along a stringer inner segment (IS), so that the ply at 0° is superimposed for example on a previously applied ply at −45° (9). The ply at 0° (5) ends at a termination edge (7) located at a distance from a stringer run-out (3). This phase of terminating the ply at 0° can be done by simply cutting the ply or suitably sizing it before stacking. Then a ply with fibers oriented at 90° (4) is stacked so that it is partially superimposed on the previously applied ply at 0° (5), whereby forming an overlap segment (OS) between both plies.

As seen in the drawings, the ply at 90° extends from a termination edge (6) to the stringer run-out (3). The termination edge (6) is located at a greater distance from the run-out (3) than edge (7) is.

Once the plies at 0° and at 90° (5, 6) are stacked, partially overlapping one another, a third ply (10) with a fiber orientation different from 0° or 90°, for example with fibers at +45°, is then directly stacked on those two plies, extending along the entire stringer from the run-out (3), covering the overlap zone, and extending along the inner segment (IS). The effect of that third ply (10) is that it reinforces the overlap zone and the attachment between the plies at 0° and at 90° (5, 6).

Preferably, all the plies forming the stringer have the same properties, i.e., they are the same concerning stiffness, resin type, fiber type, uniform fiber orientation in one and the same ply, etc., which has the advantage that it is not necessary to manufacture several types of plies with different properties, so the manufacturing process is very simple. The only difference between plies is their orientation with respect to a fixed reference.

The length of the overlap segment is calculated according to each specific application and so that the progressive load transfer between stringer segments with a different ply structure is suitable.

The person skilled in the art will understand that even though a T-shaped stringer is shown in the drawings by way of example, the invention is likewise applicable to structural elements and stringers of another type with other profile shapes, such as for example an I-shaped profile, a U-shaped profile, an L-shaped profile, a trapezoidal-shaped profile, etc.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A stringer for reinforcing aircraft skin panels,
    comprising an inner segment and at least one run-out, said stringer being formed by a plurality of superimposed plies of composite material, wherein each ply includes reinforcing fibers oriented in one direction, wherein the number of plies with a fiber orientation at 90° is greater than the number of plies with a fiber orientation at 0° in stringer segment adjacent to said run-out;
    wherein the stringer comprises a ply at 90 and a ply at 0 superimposed on one another exclusively in an overlap segment,
    wherein a stringer height in at least one portion of the overlap segment is less than the stringer height in the stringer inner segment and a stringer thickness in the at least one portion of the overlap segment is greater than the stringer thickness in the stringer inner segment so that
    the area of a cross-section in the overlap segment is equal to the area of a cross-section of a stringer inner segment.

2. The stringer according to claim 1, wherein the number of plies with a fiber orientation at 90° in said stringer segment adjacent to the run-out is greater than the number of plies with a fiber orientation at 90° in a stringer inner segment.

3. The stringer according to claim 1, wherein the number of plies with a fiber orientation at 0° in said stringer segment adjacent to the run-out is less than the number of plies with a fiber orientation at 0° in a stringer inner segment.

4. The stringer according to claim 1, wherein in said overlap segment, the ply at 90° is attached directly to said ply at 0°.

5. The stringer according to claim 1, wherein said ply at 90° extends approximately from the stringer run-out to a first termination edge spaced from the run-out, and wherein an inner portion of that ply at 90° is superimposed on a ply at 0° coming from a stringer inner portion, and wherein said ply at 0° is interrupted at a second termination edge spaced from the same nm-out, where the second termination edge is closer to the nm-out than the first termination edge.

6. The stringer according to claim 1, wherein the ply at 90° is arranged above the ply at 0°.

7. The stringer according to claim 1, wherein the elastic modulus of the overlap segment is less than the elastic modulus of the stringer inner segment, and wherein the elastic modulus in the run-out is less than the elastic modulus of the overlap segment, such that the elastic modulus of the stringer decreases progressively from its inner segment to the run-out.

8. The stringer according to claim 1, wherein all the plies of the stringer are made of the same type of material.

9. An aircraft skin structure comprising a skin panel of an aircraft airfoil and at least one reinforcing stringer attached to said panel, wherein the stringer comprises a stringer according to claim 1.

* * * * *